(12) United States Patent
Bulgrien

(10) Patent No.: US 6,845,682 B1
(45) Date of Patent: Jan. 25, 2005

(54) SMOOTHLY SHIFTING MULTISPEED TRANSMISSION

(75) Inventor: Garth H. Bulgrien, Ephrata, PA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 10/635,115

(22) Filed: Aug. 6, 2003

(51) Int. Cl.[7] ........................ F16H 3/08; F16H 37/02; F16H 3/44
(52) U.S. Cl. ........................ 74/331; 475/219; 475/290
(58) Field of Search ................ 475/338–9, 341, 475/290, 207, 218–219; 74/329, 331, 661, 664

(56) References Cited

U.S. PATENT DOCUMENTS

| | | | | |
|---|---|---|---|---|
| 2,576,478 A | * | 11/1951 | Beckwith | 475/207 |
| 2,605,650 A | * | 8/1952 | Winther et al. | 475/207 |
| 2,890,603 A | * | 6/1959 | Miller et al. | 475/134 |
| 5,036,718 A | | 8/1991 | Bulgrien | |
| 5,906,557 A | * | 5/1999 | Kobayashi | 475/199 |
| 6,045,477 A | * | 4/2000 | Schmidt | 475/207 |
| 6,190,280 B1 | | 2/2001 | Horsch | |
| 2004/0144190 A1 | * | 7/2004 | Hall, III | 74/331 |

FOREIGN PATENT DOCUMENTS

FR  002682444 A1 * 4/1993 ................. 475/218

* cited by examiner

Primary Examiner—Roger Pang
(74) Attorney, Agent, or Firm—Collin A. Webb; John William Stader

(57) ABSTRACT

The apparatus is a 28 speed, two section, transmission that requires only a single clutch swap for most changeovers between adjacent ratios. It uses a first section with three close ratio forward speeds and one reverse along with a second section that is an 11 speed, wide ratio, transmission. The two transmission sections are arranged in series resulting at least 28 usable forward speeds. The second section includes an intermediate planetary gear set without a ring gear and an output planetary gear set that is a conventional simple planetary gear set with a two sun gears, two planes of planetary gears on a single carrier, and two ring gears.

8 Claims, 2 Drawing Sheets

FIG. 2

| Gear | | Ratio | 1/Ratio | Clutches | Swaps | Step | mph | km/h | R step | R mph | R km/h |
|---|---|---|---|---|---|---|---|---|---|---|---|
| 28 | 11H | 0.528 | 1.892 | 3,4,9 | | | 37.63 | 60.55 | | | |
| | 11M | 0.598 | 1.671 | 2,4,9 | 1 | 1.213 | 33.24 | 53.49 | | | |
| 27 | 10H | 0.641 | 1.560 | 3,5,9 | | | 31.03 | 49.92 | | | |
| | 11L | 0.677 | 1.478 | 1,4,9 | 1 | 1.132 | 29.39 | 47.28 | | 29.39 | 47.28 |
| 26 | 10M | 0.726 | 1.378 | 2,5,9 | | | 27.41 | 44.10 | | | |
| | | | | | 1 | 1.131 | | | 1.213 | | |
| 25 | 10L | 0.821 | 1.218 | 1,5,9 | | | 24.23 | 38.98 | | 24.23 | 38.98 |
| | | | | | 2 | 1.131 | | | | | |
| 24 | 9H | 0.929 | 1.077 | 3,8,9 | | | 21.42 | 34.46 | | | |
| | | | | | 1 | 1.132 | | | 1.449 | | |
| 23 | 9M | 1.051 | 0.951 | 2,8,9 | | | 18.92 | 30.44 | | | |
| | | | | | 1 | 1.131 | | | | | |
| 22 | 9L | 1.189 | 0.841 | 1,8,9 | | | 16.72 | 26.91 | | 16.72 | 26.91 |
| | | | | | 2 | 1.133 | | | | | |
| 21 | 8H | 1.347 | 0.742 | 3,5,8 | | | 14.77 | 23.76 | | | |
| | | | | | 1 | 1.132 | | | 1.451 | | |
| 20 | 8M | 1.525 | 0.656 | 2,5,8 | | | 13.04 | 20.98 | | | |
| | | | | | 1 | 1.131 | | | | | |
| 19 | 8L | 1.725 | 0.580 | 1,5,8 | | | 11.53 | 18.55 | | 11.53 | 18.55 |
| | | | | | 2 | 1.131 | | | | | |
| 18 | 7H | 1.952 | 0.512 | 3,4,8 | | | 10.19 | 16.40 | | | |
| | | | | | 1 | 1.132 | | | 1.449 | | |
| 17 | 7M | 2.209 | 0.453 | 2,4,8 | | | 9.00 | 14.48 | | | |
| | | | | | 1 | 1.131 | | | | | |
| 16 | 7L | 2.499 | 0.400 | 1,4,8 | | | 7.96 | 12.80 | | 7.96 | 12.80 |
| | | | | | 2 | 1.132 | | | | | |
| 15 | 6H | 2.828 | 0.354 | 3,7,8 | | | 7.03 | 11.32 | | | |
| | 5H | 3.171 | 0.315 | 3,4,7 | 1 | 1.132 | 6.27 | 10.09 | 1.449 | | |
| 14 | 6M | 3.202 | 0.312 | 2,7,8 | | | 6.21 | 9.99 | | | |
| | 5M | 3.590 | 0.279 | 2,4,7 | 1 | 1.131 | 5.54 | 8.91 | | | |
| 13 | 6L | 3.622 | 0.276 | 1,7,8 | | | 5.49 | 8.84 | | 5.49 | 8.84 |
| | 4H | 3.846 | 0.260 | 3,5,7 | 1 | 1.121 | 5.17 | 8.12 | | | |
| 12 | 5L | 4.061 | 0.246 | 1,4,7 | | | 4.90 | 7.88 | | 4.90 | 7.88 |
| | | | | | 2 | 1.072 | | | 1.360 | | |
| 11 | 4M | 4.354 | 0.230 | 2,5,7 | | | 4.57 | 7.35 | | | |
| | | | | | 1 | 1.131 | | | | | |
| 10 | 4L | 4.925 | 0.203 | 1,5,7 | | | 4.04 | 6.50 | | 4.04 | 6.50 |
| | | | | | 2 | 1.131 | | | | | |
| 9 | 3H | 5.571 | 0.179 | 3,6,7 | | | 3.57 | 5.74 | | | |
| | | | | | 1 | 1.132 | | | 1.449 | | |
| 8 | 3M | 6.308 | 0.159 | 2,6,7 | | | 3.15 | 5.07 | | | |
| | | | | | 1 | 1.131 | | | | | |
| 7 | 3L | 7.135 | 0.140 | 1,6,7 | | | 2.79 | 4.48 | | 2.79 | 4.48 |
| | | | | | 2 | 1.133 | | | | | |
| 6 | 2H | 8.082 | 0.124 | 3,5,6 | | | 2.46 | 3.96 | | | |
| | | | | | 1 | 1.132 | | | 1.451 | | |
| 5 | 2M | 9.150 | 0.109 | 2,5,6 | | | 2.17 | 3.50 | | | |
| | | | | | 1 | 1.131 | | | | | |
| 4 | 2L | 10.35 | 0.097 | 1,5,6 | | | 1.92 | 3.09 | | 1.92 | 3.09 |
| | | | | | 2 | 1.131 | | | | | |
| 3 | 1H | 11.71 | 0.085 | 3,4,6 | | | 1.70 | 2.73 | | | |
| | | | | | 1 | 1.132 | | | 1.449 | | |
| 2 | 1M | 13.26 | 0.075 | 2,4,6 | | | 1.50 | 2.41 | | | |
| | | | | | 1 | 1.131 | | | | | |
| 1 | 1L | 15.00 | 0.067 | 1,4,6 | | | 1.33 | 2.13 | | 1.33 | 2.13 |

United States Patent US 6,845,682 B1

SMOOTHLY SHIFTING MULTISPEED TRANSMISSION

BACKGROUND OF THE INVENTION

This invention deals generally with mechanical transmissions and more specifically with a power shift transmission with a large number of forward ratios and very smooth shifts between gear ratios.

Power shift transmissions have been in use for agricultural tractors for about 40 years. Such transmissions now provide the capability of shifting through all the forward gears while moving and while under load without using a clutch pedal. The only action required by an operator is the selection of the desired gear. The actual changeover, including the operation of one or more clutches is electronically controlled and performed by hydraulically powered clutches.

In order to provide a wide range of ratios divided into a large number of small forward ratio steps in a transmission of practical size and reasonable cost, such transmissions are actually built as two or three transmissions in a series arrangement. Such a transmission is disclosed in U.S. Pat. No. 5,036,718 issued to Bulgrien. However, in such transmissions some of the shifts between adjacent gear ratios require complex simultaneous changeovers in two or three of the transmissions. These complex changeovers frequently result in jerky shifts. Moreover, the tendency to increase the spread of the overall ratio over the years has increased the number and severity of these difficult shifts.

For example, considering only forward speeds, the 18 speed tractor transmission mentioned above is constructed with an first section having a three speed transmission with approximately 1.17 ratio steps. The first section is followed by a middle section that is a three speed transmission with ratio steps of approximately 1.6 and then an output section that is a two speed transmission with a 4.1 ratio step. First gear is achieved by using the lowest ratio in each of the three transmission sections. Second and third gears are then achieved by shifting only the input section while leaving the lowest ratio selected in the middle and output sections. When shifting from $3^{rd}$ to $4^{th}$ gear, the middle section is shifted from its lowest ratio to its intermediate ratio while the input section is shifted from its highest ratio to its lowest ratio. This multiple changeover pattern continues through all of the ratio combinations to yield the 18 different gear ratios.

However, such a transmission causes discontinuities in the vehicle motion, the so called jerky shifts, when one or more sections are being upshifted while another is being shifted down. Each individual shift involves clutch action that engages one clutch and gear set and disengages another. Such changeovers are referred to in the industry as "clutch swaps". The multiple gear changes are then referred to as "double swaps" and "triple swaps" as each section of the transmission is shifted by "swapping" clutches, that is, releasing one clutch and applying another. Shifting two sections thus involves two clutch changeovers, a double swap, and shifting all three sections involves three changeovers, a triple swap.

The worst condition for the transmission described above occurs when making the triple swap required to downshift from 10th to 9th gear while under load. To accomplish this shift, the input and middle sections are both shifted from their lowest ratios to their highest ratios while the output section is shifted from its high ratio to is low ratio. To make this shift with minimal change in ground speed would require setting the pressure in the high ratio clutch in the output section to a level that is just sufficient to transmit the torque required by the load, then shifting the input and middle sections to bring up the speed of the intermediate gears and shafts, then completing the shift to the low ratio clutch in the output section. To do this the engine and flywheel would have to momentarily provide enough torque to pull a 10th gear load in $18^{th}$ gear while the intermediate gears and shafts accelerate. $18^{th}$ gear is about 3.5 times faster than $10^{th}$ gear. In fact, the clutches in the input and middle sections do not have sufficient torque capacity to do this, and even if they did the loss in engine speed would be severe. To complete the shift without coming to a complete stop and without excessive loss of engine speed, the output speed is allowed to drop rapidly for a brief time while the intermediate gears and shafts accelerate. It is this action that causes a jerky shift.

The ratio change in the transmission sections that are shifted up during an overall downshift is a good indicator of the difficulty in making shifts involving multiple clutch swaps. In the transmission described above, the shift from $7^{th}$ to $6^{th}$ gear can be made quite smoothly. This shift requires shifting the input section from its lowest ratio to its highest ratio while shifting the middle section from its highest ratio to its intermediate ratio. To make this shift with minimal change in output speed requires effectively momentarily pulling a $7^{th}$ gear load in 9th gear. The ratio between $7^{th}$ gear and $9^{th}$ gear is only about 1.37 compared to the ratio of 3.5 between $10^{th}$ gear and $18^{th}$ gear discussed in the example above, so the downshift from $7^{th}$ gear to $6^{th}$ gear is much smoother and less difficult than the shift from $10^{th}$ gear to $9^{th}$ gear.

One very beneficial solution would be to have a power shift transmission in which all shifts between adjacent gears were accomplished with single clutch swaps as described in U.S. Pat. No. 6,190,280 to Horsch, because this would theoretically provides smooth shifts going both up and down. However, the Horsch transmission has rather uneven ratio steps and this condition is further aggravated if the overall ratio range is increased.

SUMMARY OF THE INVENTION

The preferred embodiment of the present invention provides a two section power shift transmission that requires only a single clutch swap for most changeovers between adjacent ratios, and uses double swaps for only a few changeovers. No triple swaps are required. Many of the resulting forward ratios are in near geometric progression. For example, in the preferred embodiment in most cases shifting down one speed results in an increase in the gear ratio of about 13 percent.

This is accomplished by the use of a first section with three close ratio forward speeds and one reverse along with a second output section that is an 11 speed, wide ratio, transmission section. The two transmission sections are arranged in series resulting in 33 forward ratios and 11 reverse ratios. Although some of the ratios produced are nearly duplicates of others, skipping these duplicate ratios still yields at least 28 usable forward speeds.

The invention produces a nearly geometric progression of the ratios, but, because of the required double clutch swaps for some of the shifts, with a slight compromise of shift quality. For the present invention, the most difficult downshifts involve shifting the 3 speed section up from $1^{st}$ to $3^{rd}$ while downshifting the 11 speed section. However, due to the small ratio steps, this only involves about a 1.28 to 1 speed increase from the input section. This is a great improvement over all current and previous power shift transmissions on the market.

Among the advantages of the present invention are its elimination of the difficult shifts which have previously been inherent in all full power shift tractor transmissions and its small ratio steps that approximately match the smallest ratio steps currently available. Furthermore, the present invention's 33 ratios and 28 forward speeds provides a wider overall ratio spread and more forward speeds than any power shift transmissions currently available.

BRIEF DESCRIPTION OF THE DRAWINGS

FIG. 2 is a chart showing the gear sequences and clutch combinations attainable with the transmission shown in the schematic diagram of FIG. 1.

DETAILED DESCRIPTION OF THE INVENTION

Figure 1:
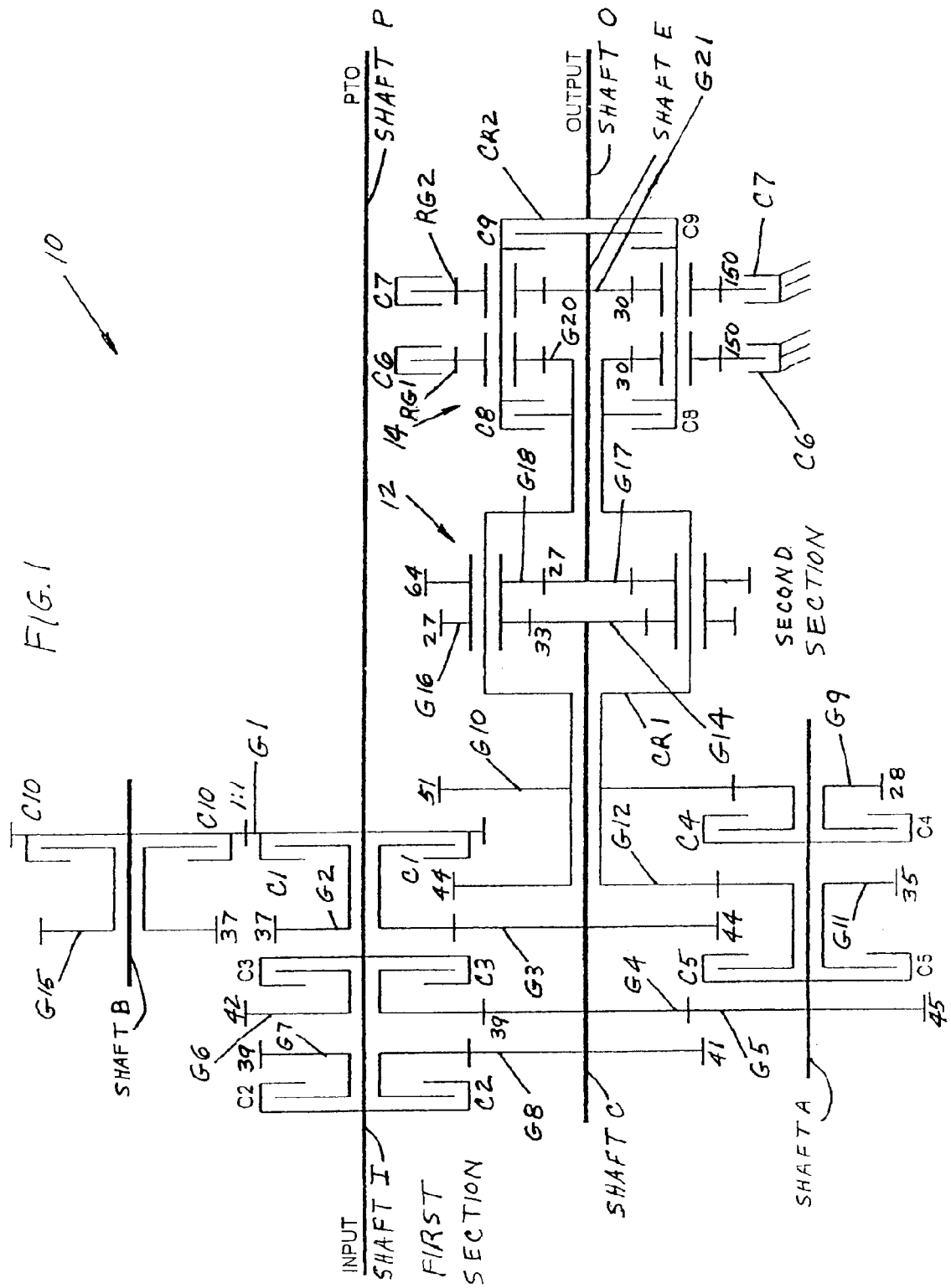
FIG. 1 is a schematic diagram of the transmission of the preferred embodiment of the invention.

FIG. 1 is a schematic diagram of transmission 10 of the preferred embodiment of the invention in which each of the ten clutches is identified by the designation C1 through C10 located adjacent to the symbol for the clutch, shafts are identified adjacent to their symbols, and gears are identified by numerals preceded by the letter G and identifying lines. It should also be understood that the clutches are all pictured in a vertical orientation and labeled near both ends for clarity. On the other hand, although all gears are also pictured in a vertical orientation and have two ends, they are typically labeled only once. The number of teeth in each gear of the preferred embodiment is indicated by the number adjacent to the symbol representing the gear in FIG. 1. Furthermore, the relative size relationship of gear diameters is also shown in FIG. 1. That is, larger gears are shown larger and smaller gears are shown relatively smaller. Moreover, where possible, driver and driven gears are shown adjacent to each other, but where they are not drawn adjacent to each other, their relationship is explained in the text.

FIG. 1 is divided into a first section and a second section. The first section includes input shaft I, three clutches C1, C2, and C3 driven directly from input shaft I, clutch 10 for reverse, several gears driven directly by these clutches, and shaft C. The second section includes shaft A, clutches C4 and C5 and their associated gears, planetary gear set 12, planetary gear set 14 and output shaft O.

Power from the engine (not shown) is delivered to transmission 10 at input shaft I, and shaft I also functions as shaft P, the power takeoff (PTO) shaft. The PTO shaft delivers power to a conventional hydraulic system (not shown) which ultimately furnishes the power for the operation of all the clutches described.

Input shaft I also is attached to and drives clutches C1, C2, and C3, and by means of gear G1, it also drives C10 (the reverse clutch). Selections are made from these clutches to drive the rest of transmission 10. The operation of FIG. 1 will be more easily followed by the simultaneous use of the gear sequence chart of FIG. 2.

The gear sequence chart of FIG. 2 lists the highest gear ratio at the top of the chart and the lowest gear ratio at the bottom, with the entire sequence progressing between the highest and lowest gears. Lines that are not numbered in the "Gear" column have small numerals to indicate that these gear ratios are not recommended for use because they are too close to other ratios which have been selected. The columns of FIG. 2 are labeled as noted, and they provide the information indicated below for each horizontal line.

Col. "Gear" identifies the gear selection within the sequence for the line.

Col. 2 indicates the gear selection within the second section of the transmission with a number and the gear selection within the first section with L (low), M (medium), or H (high) for the line.

Col. "Ratio" shows the actual gear ratio for the gear selection.

Col. "1/Ratio" gives the inverse of the gear ratio, a number used for design criteria.

Col. "Clutches" shows the clutches shown in FIG. 1 that are engaged for the gear selection.

Col. "Swaps" shows the number of clutch swaps required to change between the gear selections immediately above and below the line.

Col. "Step" indicates the change in ratio between the gear selections immediately above and below the line.

Col. "mph" tells the ground speed for the gear selection in miles per hour.

Col. "km/h" tells the ground speed for the gear in kilometers per hour.

Col. "R step" indicates the change in ratio for reverse speeds.

Col. "R mph" tells the ground speed in reverse in miles per hour.

Col. "R km/h" tells the ground speed in reverse in kilometers per hour.

It should be noted that, for reverse speeds in the chart of FIG. 2, gear selections for ground speeds over 12 mph and one lower speed at gear selection 12 are not actually used, although they are theoretically available. As with the other unused gear selections, these lines are printed with smaller numerals.

Several gear selections are described below with reference to FIG. 1, beginning with gear selection 1, at the bottom line of FIG. 2.

Gear selection 1 produces a ground speed of only 1.33 mph, and for it clutches C1, C4, and C6 are engaged. Clutch C1 is connected to gear G1 that is permanently attached to input shaft I so that gear G1 is constantly rotating. The engagement of clutch C1 causes gear G2 to rotate, and gear G2 drives gear G3 that is attached to shaft C. Shaft C then drives shaft A through gears G4 and G5. In fact, gears G4 and G5 always drive shaft A from shaft C so that the speed of shaft A is determined by the selection of either clutch C1, C2, C3, or C10 (reverse) that interconnect shaft I to shaft C with different size gears.

Therefore, there are three forward and one reverse speed choices available between shaft I and shaft C. There are three forward gear combinations, G2 to G3, G6 to G4, and G7 to G8 that connect shaft I and shaft C depending upon the selection of clutches C1, C2, or C3. In the preferred embodiment of the invention, theses gear combinations are designed to yield gear ratio steps of 1.13 as the engaged clutch is sequenced from C1 to C2 to C3.

For clarification, it should be understood that gear G15, which is the gear powered from reverse clutch C10, actually engages gear G3, although they are not shown in contact in FIG. 1. Reverse clutch thereby also interconnects shaft I with shaft C, but, of course, with reverse rotation.

Clutches C4 and C5 then provide the choice of two gear sets with different ratios, G9 to G10 and G11 to G12, by which to drive planetary gear carrier CR1 and sun gear G20 from shaft A. For gear selection 1 of FIG. 2, clutch C4 is engaged to rotate sun gear G20. In gear selection 1 of FIG. 2, clutch C6 is also engaged. This stops ring gear RG1 of output planetary gear set 14 and causes output carrier CR2 to rotate at a slower rate than sun gear G20. Output shaft O, which is attached to output carrier CR2 is thereby driven from shaft A through the planetary reduction of output planetary gear set 14.

It should be understood that intermediate planetary gear set 12 is constructed without a ring gear to accomplish its required operation while output planetary gear set 14 consists of two conventional simple planetary gear sets with two sun gears, two planes of planetary gears mounted on a single carrier, and two ring gears.

The three lowest gear selections of FIG. 2 are accomplished by merely swapping through clutches C1, C2, and C3.

Another example taken from FIG. 2 is the series of steps from gear selection 16 through gear selection 24. This sequence starts at gear selection 16 with clutches C1, C4, and CB engaged. Clutch C8 directly connects output carrier CR2 and output shaft O to intermediate carrier CR1, so that clutch C1 and C4 determine the speed of output shaft O. Gear selections 17 and 18 then swap clutch C1 to C2 and then to C3, thus increasing the gear ratio by 1.13 with each step.

For gear selection 19 there is a double swap when clutch C3 is exchanged for clutch C1 for a lower gear ratio while clutch C4 is exchanged for clutch C5 for a higher gear ratio. The net change in ratio with these two swaps is 1.13, essentially the same as the last two steps. The next two gear selections merely require once more moving from clutch C1 to clutches C2 and C3, each with a ratio change of 1.13.

Then for gear selection 22, there is another double swap. Clutch C3 is again exchanged for clutch C1 and clutch 5 is exchanged for clutch C9. Here again the net ratio change is 1.13.

With both clutches C8 and C9 engaged and neither C4 nor C5 engaged, output shaft O is locked onto sun gear G21 and sun gear G20 of the output planetary gear set. This causes the intermediate carrier and sun gear G17 to rotate at the same speed, thus forcing intermediate planetary gear set 12 to rotate as a unit. The result is that shaft C and output shaft O rotate at the same speed. Once again, the next two gear selections merely require moving from clutch C1 to clutch C2 and then to C3, each with a ratio change of 1.13.

With only a few exceptions, FIG. 2 shows that the entire sequence of gears is accomplished by selecting one of the 11 available gear ratios in the second section and then stepping through the three forward gear selections in the first section.

The second section includes a two speed gear section with clutches C4 and C5 providing a 1.28 ratio change between their gear sets, an intermediate planetary gear set without a ring gear but with input and output sun gears, and an output simple planetary gear set.

The two speed gear section includes clutches C4 and C5 that provide the choice of two gear sets with different ratios, G9 to G10 and G11 to G12. Both of these gear sets are attached to planetary gear carrier CR1. Thus, by the selection of either clutch C4 or clutch C5, the speed of carrier CR1 can be changed relative to the speed of shaft A.

Inverting planetary gear set 12 provides a ratio inverting function that provides the means for making shifts between any adjacent ratios in the 11 speed second section with a single clutch swap. Shaft C is connected to input sun gear G14 to provide a reaction member rotating at a reference speed. When C5 is engaged, G12 drives G20 at a lower rotational speed than shaft C, but inverting planetary gear set 12 causes G21 to rotate at a higher rotational speed than shaft C. As the rotational speed of the inverting carrier is reduced relative to shaft C, the rotational speed of G17 and G21 are proportionally increased relative to shaft C. Thus, when G20 is driving the output shaft, shifting from C4 to C5 causes the rotational speed of the output shaft to increase, but when G21 is driving the output shaft, shifting from C5 to C4 causes the rotational speed of the output shaft to increase.

Output planetary gear set 14 adds still more gear ratios possibilities. One is that clutch C9 permits carrier CR2 and output shaft O to be connected directly to output sun gear G17 of inverting planetary gear set 12 by means of shaft E. Another is that clutch C8 can connect carrier CR2 and output shaft O directly to carrier CR1 of inverting planetary gear set 12. Furthermore, when both clutches C8 and C9 are engaged, output shaft O and both carriers CR1 and CR2 are attached to shaft C.

Moreover, clutches C6 and C7 can brake their respective ring gears RG1 and RG2 to transmit rotation to carrier CR2. When clutch C6 is engaged carrier CR2 is driven through the gear reduction of output planetary gear set 14 through its sun gear G20, and when clutch C7 is engaged carrier CR2 is driven from shaft E through the gear reduction of output planetary gear set 14 through its sun gear G21.

As disclosed in FIG. 2, these multiple variations in the gear ratios within the second section of the transmission along with the three forward and one reverse ratio available from the first section of the transmission give the preferred embodiment of the invention the ability to furnish 28 distinct speed variations.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, bevel gears can also be used within inverting planetary gear set 12, and different configurations of planetary gear systems, such as the use of a ring gear to replace one sun gear in planetary gear set 12, can be used to accomplish the same results.

What is claimed as new and for which Letters patent of the United States are desired to be secured is:

1. A multispeed transmission comprising:
  a gear set with a first input, a second input, and an out arranged so that when the first input is rotated, and the second input is rotated in the same direction but at a slower rate than the first input, ten the output rots in the same direction but at a faster rate than the first input;
  clutches and associated gears to rotate the second input at any of at least two fixed ratios of the rate of rotation of the first input;
  a clutch to connect the second input to an output shaft; and
  a clutch to connect the output to the output shaft.

2. The transmission of claim 1 in which the gear set comprises a planetary gear set with one carrier and two sun gears, the first input is one sun gear of the planetary gear set, the second is the carrier of the planetary gear set, and the output is the other sun gear of the planetary gear set.

3. The transmission of claim 1 further comprising an input shaft, clutches, and associated gears to rotate the first input at any of at least two fixed ratios of the rate of rotation of the input shaft.

4. The transmission of claim 1 further comprising an additional clutch and associated gear reduction means arranged to connect the output to the output shaft through a gear reduction.

5. The transmission of claim 1 further comprising an additional clutch and associated gear reduction means arranged to connect the second input to the output shaft through a gear reduction.

6. The transmission of claim 4 further comprising an additional clutch and associated gear reduction means arranged to connect the second input to the output shaft through a gear reduction.

7. A multispeed transmission for farm machinery comprising:
   a first section connected to and receiving power from an engine, the first section including an input shaft interconnected with the engine and at least a first, and a second gear set, each with a different gear ratio, interconnected with the input shaft, with each gear set capable of driving a first intermediate shaft; with the each gear set each controlled by a corresponding clutch, and with all the clutches driven by the input shaft;
   a second section comprising:
      a second intermediate shaft interconnected with and driven by the first intermediate shaft,
      a fourth and a fifth gear set interconnected with the second intermediate shaft and controlled by a fourth and fifth clutch, respectively, with the fourth and fifth gear sets having different gear ratios;
      an intermediate planetary gear set with a carrier, an input sun gear, input planetary gears, an output sun gear, output planetary gears, and an output shaft attached to the output sun gear, with the carrier attached to gears of the fourth and fifth gear sets, and the input sun gear attached to the first intermediate shaft;
      an output planetary gear set with a carrier, a first ring gear, a second ring gear, a first sun gear, a first plane of planetary gears, a second sun gear, and a second plane of planetary gears, with the first sun gear attached to the second intermediate shaft and the second sun gear attached to the output shaft of the intermediate planetary gear set;
      a sixth clutch attached to and, when engaged, braking the first ring gear of the output planetary gear set;
      a seventh clutch attached to and, when engaged, braking the second ring gear of the output planetary gear set;
      an eighth clutch attached to the carrier of the output planetary gear set and to the second intermediate shaft and, when engaged, connecting the carrier of the output planetary gear set to the second intermediate shaft;
      a ninth clutch attached to the carrier of the output planetary gear set and to the output shaft of the intermediate planetary gear set and, when engaged, connecting the carrier of the output planetary gear set to the output shaft of the intermediate planetary gear set; and
      a transmission output shaft attached to the carrier of the output planetary gear set.

8. The transmission of claim 7 further including a reverse clutch and reverse gearing in the first section so that when the reverse clutch is engaged, the first intermediate shaft rotates in the revere direction from the direction of rotation when any other clutch in the first section is engaged.

* * * * *